Patented Sept. 19, 1922.

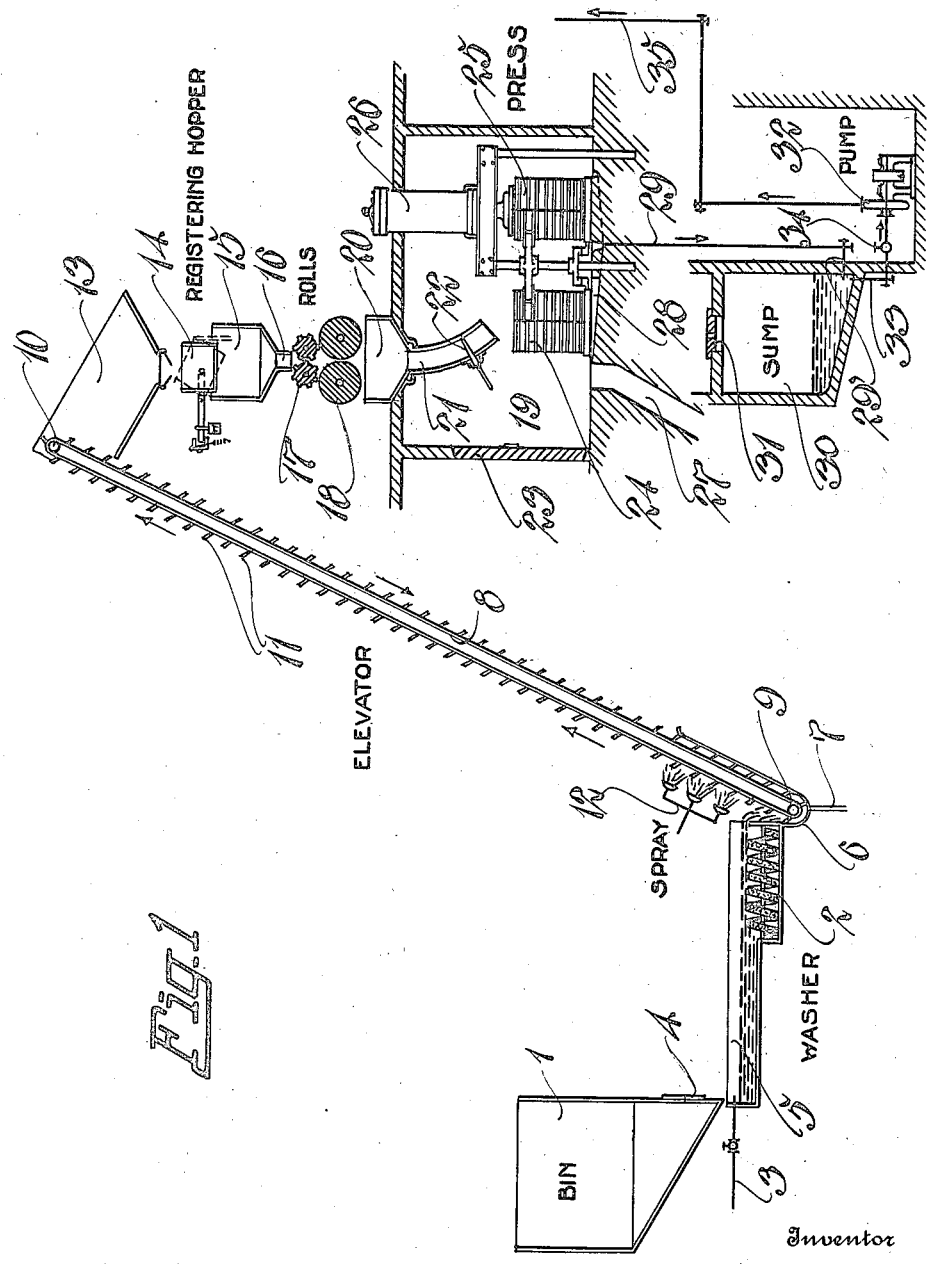

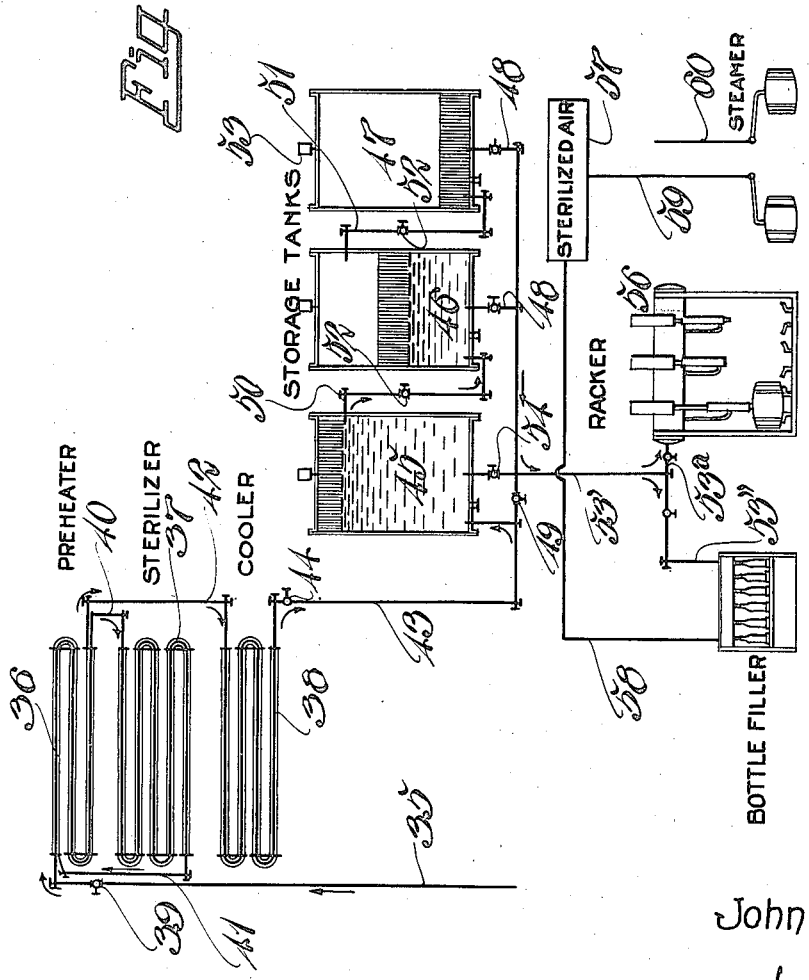

1,429,679

UNITED STATES PATENT OFFICE.

JOHN G. F. HIEBER, OF SPOKANE, WASHINGTON.

PROCESS FOR TREATING FRUIT JUICES.

Application filed September 13, 1920. Serial No. 409,862.

*To all whom it may concern:*

Be it known that I, JOHN G. F. HIEBER, a citizen of the United States, residing at Spokane, in Spokane County and State of Washington, have invented certain new and useful Improvements in a Process for Treating Fruit Juices, of which the following is a specification.

My present invention relates to improvements in the process of treating fruit juices, for the production of a non-alcoholic, sterilized fruit juice in the form of ciders, grape juice, berry juice, etc., for beverages and other purposes.

In the production of fruit juices under present conditions, most juices, at the initiation of the process contain a large percentage of bacteria, ferments and yeasts which must be eliminated in order to prevent the change of quality or fermentation and consequent loss as a non-alcoholic beverage.

To eliminate these bacteria and yeasts, sterilization at a high temperature, of the finished product, is necessary and is resorted to as a usual practice, with the frequent and undesirable and objectionable result that the flavor of the fruit is lost, the juices have a cooked taste, and are therefore unsuitable for a high grade product. To restore the juice to a palatable condition, doctoring with chemicals is resorted to, and the original quality and flavor of the fruit or berry are thus destroyed.

To overcome these objectionable features, and other well known difficulties in the production of pure fruit juices, I utilize as one of the steps of my process, a sterilization of the juices at a comparatively low degree of temperature, and avoid the high degrees of temperature that would destroy the flavor of the fruits.

Thus under customary practice, a high temperature of approximately 200 degrees F. is necessary and this heat is applied to the fruit juice for intensive sterilization, resulting in a low grade product.

In carrying out my invention I sterilize the juice with heat at a temperature of from 140 degrees F. to 150 degrees F., and subject the juice to this moderate sterilizing temperature for a comparatively long period, and, due to this step, and other steps in my process, I attain a high grade finished product.

By the utulization of my process, hereinafter described I am enabled to attain results by means of which unfermented juices are gathered, infection of the juice is prevented, contact with the atmosphere and consequent deterioration is eliminated, and a pure fruit juice is finally stored in bottles or other containers for dispensing to the trade.

For a graphic illustration of my process of treating fruit and the juices resulting therefrom, I have depicted in the accompanying drawings, in a diagrammatic manner, the apparatus utilized for attaining the objects of my invention. It will be understood that changes and alterations may be made in the apparatus and process herein shown and described, within the scope of my appended claims without departing from the spirit of my invention.

The drawings show one form of the physical embodiment of my invention in which the steps of the process are carried out according to the best method or sequence I have thus far devised for the practical application of the principles of my invention.

Figure 1 is a view showing diagrammatically the apparatus involving the fruit feeding and cleaning devices, the press, the juice gathering reservoir or sump, the sump pump and circulating pipes to the appliances illustrated in Figure 2.

Figure 2 illustrates the means for preheating, sterilizing and cooling the juices, the storage tanks, and the apparatus for packaging or bottling the finished product.

One of the essential factors of primary importance in the production of pure fruit juices is that of cleanliness, and for this reason I first introduce the fruit, as apples, from the supply bin 1 in Figure 1 to a washer 2, which may be supplied with fresh water from the inlet pipe 3. Apples, or other fruit, which may be of a second or third grade, but entirely free from blemishes, worms, rot, bruises, or over-ripeness, are fed from the bin 1 through an open door 4 to the conveyer 5, and floated on the water in this conveyer to the washer 2. The washer may be of any suitable type, and is here shown as a spiral, rotary, brush, which contacts with the apples as they are floated thereto from the conveyer, and removes foreign matters. Fresh water is supplied to the conveyer and washer, and after serving its purpose the water may be disposed of through a trough 6 by way of the outlet or drain pipe 7. The trough 6 is located at the lower end of and beneath an inclined, endless elevator 8, supported upon lower and upper drums 9 and 10 respectively, and provided with a series of conveying devices 11 which pass through a path adjacent to the outlet end of the washer and through the trough 6. As these conveying devices or receptacles 11 pass the washer outlet they receive the washed apples and elevate them to the top of the elevator, passing through a spray or shower of water from a spray device 12 located just above the hopper. In the washer the apples are thoroughly cleansed, and as they pass the spray device a final washing or cleansing is administered to eliminate the last vestige of dust or dirt therefrom in order that no contaminating element may be present on the apples as they are subjected to the extraction of juices therefrom.

At the upper end of the elevator, the cleansed apples are received in the hopper 13, and are passed by gravity through a weighing machine 14 to the feed hopper 15, preparatory to crushing and grinding. Beneath the hopper and opening from its lower end or bottom, is a chute 16 to control the passage or flow of the fruit therefrom after the latter has been weighed and proper records taken.

To facilitate the extraction of the juices from the fruit, I preferably crush the fruit and then grind it to a finer consistency before submitting the ground pulp to the juice extracting press. For this purpose I utilize a pair of preliminary crushing rolls 17, 17 located just below the chute, arranged in parallelism and suitably driven. These rolls are spaced apart as desired in order that the apples may be crushed between them as they rotate or revolve, to convenient size, and then the crushed fruit is subjected to similar treatment between the larger grinding rolls 18 positioned just below the crushing rolls and adapted to receive the crushed fruit from the crushing rolls. These two pairs of rolls are actuated in unison, to first crush the whole apple to convenient size preliminary to the action of the main rollers 18 between which the crushed fruit is ground to a pulpy mass. To avoid the possibility of tainting or spoiling the fruit by corrosion or otherwise, the two sets of rolls are composed of material which is chemically pure and not calculated to affect the juices that are expressed from the fruit or the fruit itself. I have found in actual practice that granite, or similar stone formations, is eminently satisfactory for this purpose, and the crushed fruit and juices extracted therefrom are found to be unaffected and pure.

After the fruit has been crushed and ground by the rolls 17 and 18 as a preliminary step for the extraction of the juices, the crushed fruit and juices extracted therefrom are conveyed by gravity to the press room 19, through the hopper 20 and spout 21. The spout is equipped with a gate 22 for controlling the passage of fruit and juices to the compartment 19 where the mechanism for expressing or extracting the fruit juices is located.

This compartment is so constructed as to be substantially sealed against ingress or egress of air when the door 23 is closed, and is of sufficient proportions to permit attendants or operators to work therein. To insure perfectly sanitary conditions within the compartment, air is first heated to a temperature to accomplish its sterilization, and then the air is relatively cooled. The sterilized air is then introduced to the compartment 19 and is at a temperature to permit the workmen to attend to their duties, but it will be understood that the sterilized air is free from all possible containing agencies that might affect the fruit juices. The air in the compartment will be changed with sufficient frequency to provide at all times a sterile atmosphere within the compartment.

Within the compartment 19 is contained a fruit press involving the use of a receiving basket 24 and an expressing basket 25, together with a compression mechanism 26. The positions of these two baskets are interchangeable, in order that one may be emptied of the pomace resulting from compression of the crushed fruit, through the outlet 27, and then filled with a fresh supply of crushed fruit together with any juice that may be expressed therefrom by the crushing and grinding rolls, of the crushing mill.

The pomace may be recovered and utilized, when dried, for shipment and subsequent filling in certain kinds of fruit preserves, jellies, jams, &c., or it may be used for stock food.

The basket 25 containing the crushed and ground fruit is located in position beneath the press 26, in order that the juices may be expressed therefrom as described in my application for patent No. 373,267, filed April 12, 1920, to which reference may be had for details of construction and operation of the press.

The extracted juices are gathered in the central drain trough 28 in the base or floor of the press, and, passing by gravity through the drain or outlet pipe 29 and branch pipe 29', the fruit juices flow into the reservoir or sump 30 provided for the purpose. This receiving reservoir or sump is a closed receptacle or structure having a lid 31 to effectively close the interior of the reservoir from the atmosphere, and thus protect the gathered juices from contamination while in the reservoir.

The juices are now ready for sterilization, which is accomplished at this stage of process at a comparatively low temperature, for the purpose of eliminating bacteria from the juices before they can multiply. I have found that by thus subjecting the juices to sterilization immediately following their extraction from the fruits when the quantity of bacteria therein is at a minimum a lower temperature of the sterilizing agency may be used than if the sterilization is postponed until a later stage of the process. At a later stage the bacteria and yeasts have increased, and therefore a higher degree of temperature is required and a more intensive sterilization is necessary resulting in the objectionable conditions hereinbefore set forth.

From the reservoir 30 the fruit juices are conveyed directly by pump 32, through a circulation system including the reservoir outlet pipe 33 which is controlled by the valve 34, through the pipe line 35 to the treating devices illustrated in Figure 2 of the drawings. After being pumped from the reservoir, the juice is passed through a preheating coil 36, thence through a sterilizing coil 37, and is finally passed through a cooling coil 38.

These coils are arranged in such manner that the liquids are first preheated in coil 36, then sterilized in coil 37 and before reaching the cooling coils the juices are returned to the preheating coil, and from there passed to the cooler. By this arrangement the incoming juices are preheated by the outflowing juices from the sterilizer, before the former reach the sterilizer, and the exchange of heat between the outflowing and inflowing juices, materially reduces the temperature of the outflowing juices before they reach the cooler, thus economizing in the heat required to sterilize the juices and relieving the cooler of a considerable reduction in the temperature of the inflowing juices.

Preferably the several coils are made up of pipe sections of larger diameter than the juice conveying pipes which latter are enclosed within the coils. The flow of fruit juice to the preheater is controlled by valve 39, and the preheater pipes are connected by a branch pipe 40. The sterilized juice is returned to the preheater by return pipe 41, having its outlet connected to the cooler pipe 42.

From the cooler, the sterilized and cooled juices are distributed through pipe 43 and controlled by valve 44 therein, for storage purposes in tanks or vats indicated at 45, 46, 47, through branch pipes 48 which enter through the bottoms of the several vats or tanks. The passage of liquid may be controlled in the branch pipes by valves 49, to fill all of the tanks simultaneously, or the tank 45 may first be filled, and the remainder tanks then successively be filled therefrom by utilizing the overflow pipes 50 and 51 each controlled by a valve 52.

The juice is received in these storage tanks at normal temperature, and is protected from air by a sealing gas which is heavier than air. Thus carbonic acid gas may be admitted to the tanks through a valve located in the bottom of the tanks. As the level of the liquid rises in the tanks, the air above the gas is gradually lifted and may be forced out of the tanks through their respective valves. Should an excess quantity of liquid enter the tanks and force out both air and gas, the valves are designed to automatically close against egress of liquid, and thus prevent its escape. Under normal conditions, however, the excess liquid in one tank will overflow into the succeeding tank of the series, still maintaining a layer of sealing gas above the liquid in the tank.

Each of the tanks may be provided with an outlet pipe 53 controlled by a valve 54, and provided with a branch 53' leading to a filter, then a bottling machine 55, or a branch 53a leading to a racker 56 for filling barrels, and both these filling machines are equipped with means for treatment of sterilized air from the sterilizer 57 as by the respective supply pipes 58 and 59. In addition to the sterilized air treatment, the barrels may be steamed and cleansed from a steamer 60.

For the production of pure fruit juices, it is imperative that the utmost care be exercised to insure sanitary and clean instrumentalities for handling the juices, and for this reason the conveying pipes as 29, 35, the pump connections, the connections around the fruit-juice sterilizers and coolers, and the connections to the storage tanks and from there to the filling machines, are all provided with joints and couplings which are detachable. This arrangement of parts permits the passage through the pipe sections of a swab to clean out the walls of the pipes at required intervals, and to further insure cleanliness, solvents and detergents are forced through the pipes. Steam is also forced through the piping and connections for sterilizing, and it will be understood that all receptacles, containers, &c., are frequently cleansed and sterilized under steam pressure to provide absolutely sterile conditions in order to prevent creation or growth of bacteria. In usual practice I thoroughly sterilize all the containers and receptacles before starting a run, and after cleaning the pipes and containers, sterilized air is forced into the system, which is later expelled therefrom by the entrance of the fruit juices. Before drawing off the juices from the storage tanks or vats, the tubing is all sterilized as by attaching a steam hose thereto and forcing steam under pressure to the tubing, to be followed by sterilized air. The bottles of the bottling machine are also filled with sterilized air which is displaced by the inflowing juices, and the barrels are first steamed and then filled with sterilized air, which is later displaced by the fruit juices flowing therein. Extreme precaution is taken by sterilizing the air in the rooms where the bottling and barreling machines are located, and the bottle stoppers or corks and barrel bungs are sterilized and immediately placed in position to close the receptacles while in a sterilized condition.

Fruit juices prepared under the above indicated conditions and according to my process are thus sterilized when the bacteria is at its minimum formation and is prevented from growing or increasing, and the sterilization is thus accomplished at a comparatively low temperature of the sterilizing agency. By the elimination of bacteria, ferments and yeasts before their growth, it will be apparent that subsequent purging of the finished product will be unnecessary, and inasmuch as this subsequent, intensive purging spoils the fruit flavor and renders the juices unpalatable and unfit for human consumption, it will be obvious that this condition is avoided.

The fruit juices when packaged in bottles or barrels are, according to my process entirely sterile, and absolutely free from alcoholic content, and as all bacteria have been eliminated therefrom, germination is impossible, and the juices may be maintained in condition for use for an indefinite period of time. As long as the containers remain sealed, the juices may be shipped into all kinds of climate in any portion of the world without chemical change, and the juices will remain in their pure and fresh condition, retaining their aromatic properties and flavor.

What I claim and desire to secure by Letters Patent is—

1. The process of extracting fruit juices which consists in floating the whole fruit to a washer and there cleaning the exterior of the fruit, spraying the washed fruit, crushing and grinding the washed fruit to a pulp, expressing juices from the pulp while in a sterilized atmosphere, gathering the juice and finally sterilizing the gathered juice.

2. The process of treating fruit juices which consists in expressing the juice from the fruit while in a sterilized atmosphere, gathering the juice, sterilizing the juice, and storing the juice in gas sealed receptacles.

3. The method of treating extracted juices which consists in preheating, conveying the preheated juices to a sterilizer and there heating the juices to destroy bacteria, returning the sterilized juices to the preheater for exchange of heat, and cooling the sterilized juices.

4. The method of treating extracted juices which consists in preheating, conveying the preheated juices to a sterilizer and there heating the juices, returning the sterilized juices to the preheater for exchange of heat, cooling the sterilized juices, and storing the juices in receptacles under gas seals.

5. The process of treating juices consisting in sterilizing and cooling the juices, storing the juices in a receptacle under a gas seal, distributing the juices from said receptacles to packaging devices in a sterilized atmosphere, and sealing the packages.

In testimony whereof I affix my signature.

JOHN G. F. HIEBER.